Jan. 13, 1953 P. O. DE RAGON 2,625,441
TRACTION DEVICE
Filed June 10, 1949 2 SHEETS—SHEET 2
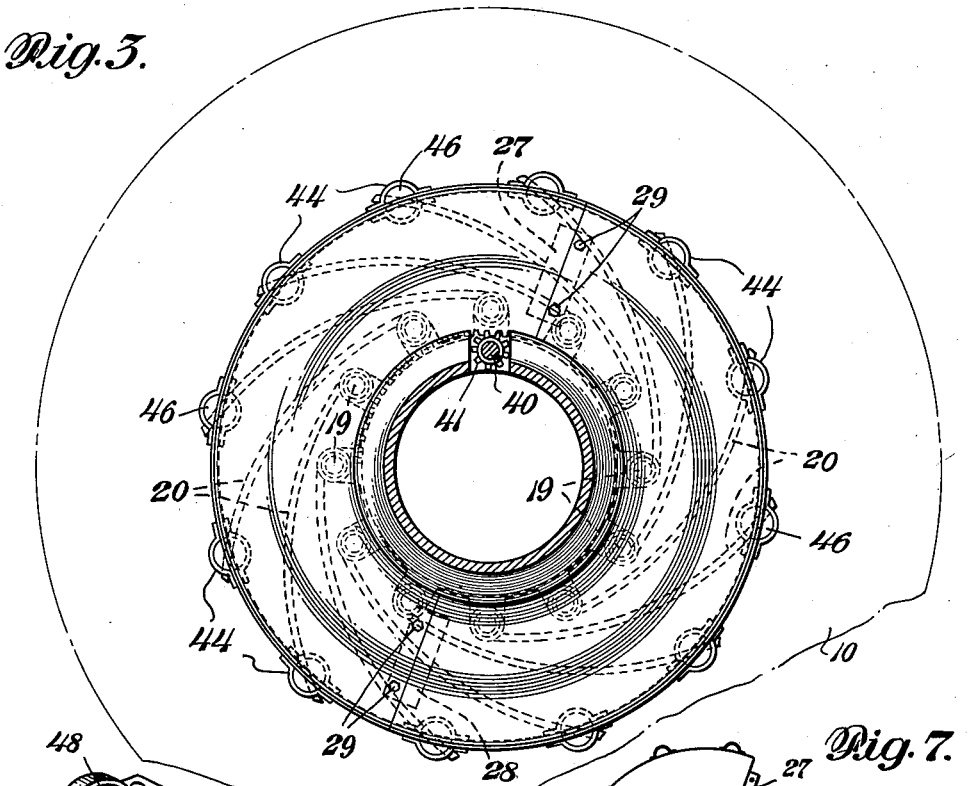
Fig. 3.
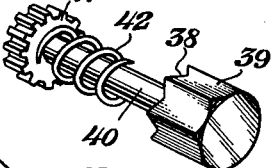
Fig. 7.
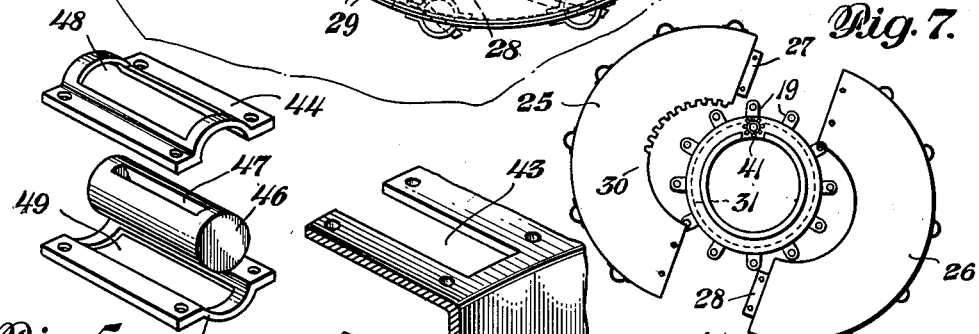
Fig. 5.
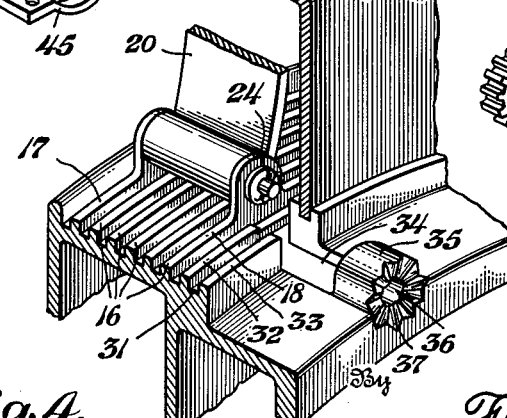
Fig. 4.
Fig. 6.
Inventor
Paul O. DeRagon,
By Flocks and Simon
ATTORNEYS Patented Jan. 13, 1953

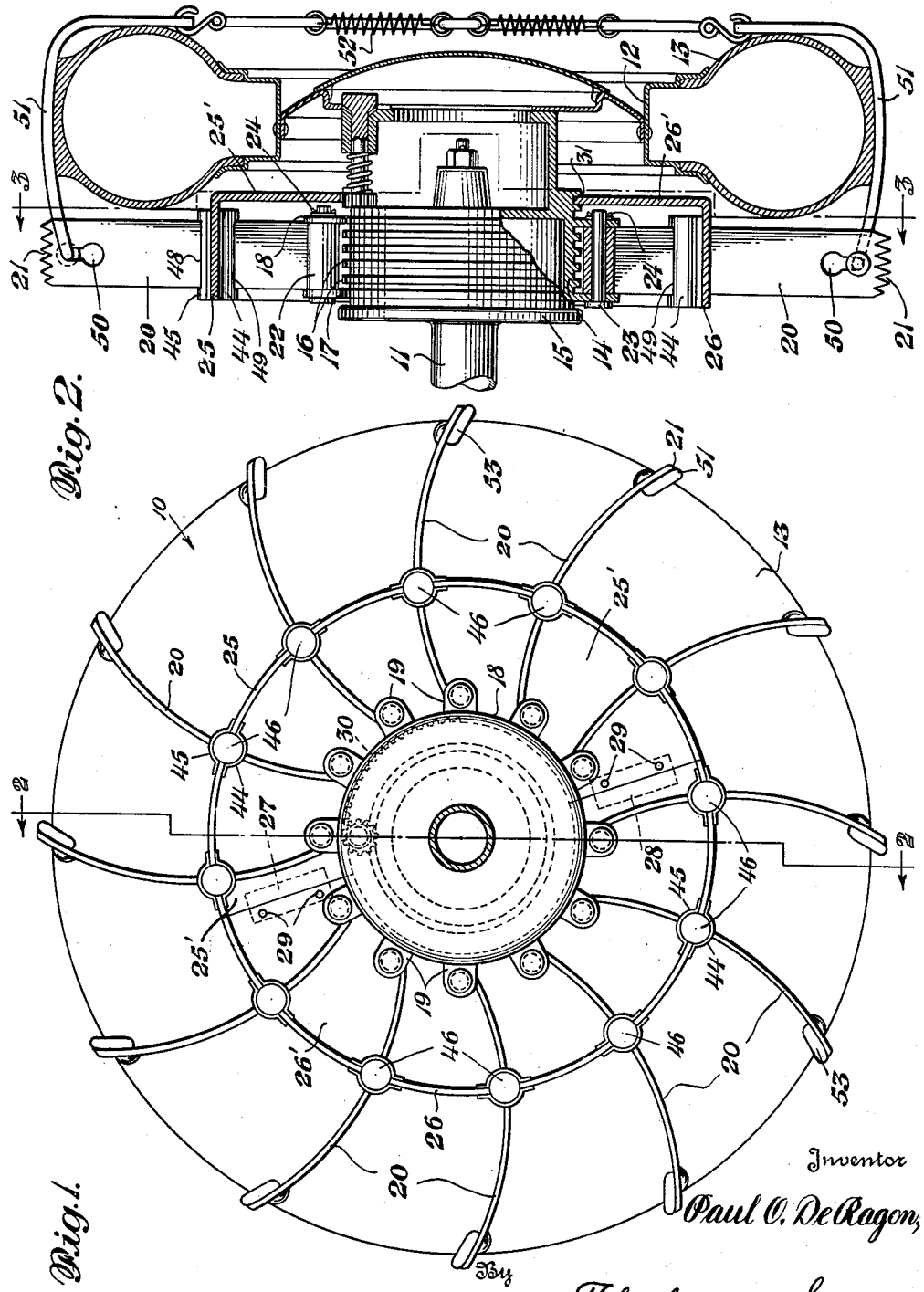

2,625,441

UNITED STATES PATENT OFFICE 2,625,441

TRACTION DEVICE

Paul O. De Ragon, Mertztown, Pa.

Application June 10, 1949, Serial No. 98,345

4 Claims. (Cl. 301—47)

My invention relates to an improved anti-skidding and traction device for the wheels of an automobile.

An object of my invention is to provide an improved anti-skidding and traction device which can be incorporated into an automobile at the time of its manufacture.

A further object of the invention is to provide means associated with the brake drum of a vehicle wheel adapted to arrest and stop motion as well as to improve traction of a vehicle on icy and slippery surfaces.

A still further object of the invention is to provide means mounted adjacent the inside of the rear wheels of an automobile which can be raised and lowered relative to the ground, and when lowered will serve as a traction improving device, and when raised will be out of contact with the ground.

Other objects and the nature and advantages of the instant invention will be apparent from the following description taken in conjunction with the accompanying drawings, wherein:

Fig. 1 is a side elevational view of the device mounted on the brake drum of a vehicle shown in operative position;

Fig. 2 is a cross-section along the line 2—2 of Fig. 1;

Fig. 3 is a vertical section taken along the line 3—3 of Fig. 2 with the device shown in an inoperative position;

Fig. 4 is a perspective sectional detail showing the manner in which the device is mounted on the brake drum of the vehicle;

Fig. 5 is a detail showing the assembly of the slotted cylinder;

Fig. 6 is a detail showing the operating pinion and control shaft; and

Fig. 7 is a diagrammatic view illustrating the assembly of the device of the present invention.

Referring to the drawings, the reference character 10 designates the vehicle wheel which may be of any construction, mounted on an axle 11, which includes a rim 12 and the tire 13. A brake drum 14 and a brake drum backing plate 15 are carried by the wheel. The outer surface of the brake drum 14 is provided with a plurality of cooling ribs 16.

The outer cooling rib 17 on the inner side of the brake drum and a cooling rib 18 near the outer side of the drum are extended at a plurality of equally spaced points about the circumference of the drum to form ears 19 which are in alignment and may be drilled to form holes through each pair of ears aligned with one another. A plurality of curved vanes 20 are provided formed of rigid metal strips of a width somewhat less than the width of the brake drum having teeth 21 or other roughened surface at their outer ends for gripping the ground when in contact therewith. The inner end of the vanes is bent into the shape of a sleeve portion as shown at 22, which is pivoted between the ears 19 on the brake drum. Each vane is pivotally attached to the ears by a pivot pin 23 which extends through the hole in the inner ear 19, the sleeve 22 of the vane, and the hole in the outer ear; and is retained in position by a cotter pin 24.

As best shown in Fig. 7, two semi-circular flanged rings 25 and 26 are joined together by flat clips 27, 28, one of which is welded to the flange portion 25' of ring 25 and bolted to the flange portion 26' of ring 26 by bolts 29. The other clip is welded to flange 26' and bolted to flange 25'. The bottom surface of the flange 25' is cut in the shape of a rack gear as shown at 30. The inner edges of the flanges of both flanged rings travel in the groove 31 formed between the two outer cooling ribs 32, 33 on the braked drum. A slot 34 is cut into the brake drum extending from the outer end thereof through the two outer cooling ribs 32, 33. A sleeve bearing 35 provided with an opening 36 is welded onto the outer portion of slot 34. The outer face of the sleeve bearing 35 contains a plurality of serrations 37, adapted to coact with similar serrations 38 on the inner face of the hexagonal head 39 of a rod 40. The rod 40 extends through the opening 36 in the bearing 35 so that the serrations of the two parts are in engagement. A pinion gear 41 is attached to the inner end of the rod 40 after a coil spring 42 has been inserted surrounding the rod between the pinion gear and the inner face of the bearing 35. The spring maintains the serrated face of hexagonal head 39 and the serrated face of bearing 35 locked together to prevent rotation of the rod until the correct projection of the vanes is reached. The pinion gear 41 is positioned so that its teeth are in contact with the teeth of rack gear 30, so that rotation of the rod 40 resulting in rotation of the pinion gear 41 causes the rotation of the rack gear 30 of the flanged ring 25. In rotating the head 39 of the rod 40, the serrations 37 and 38 slide over each other against the action of the spring 42. The pinion gear 41 is wide enough so that it is in contact with the rack gear of the movable ring 25 even while the serrations slide over each other.

The ring portion of the flanged rings 25 and 26 are provided with a plurality of slots 43 corresponding to the number of vanes 20. Bolted to the ring at each slot is an upper semi-circular bearing 44 and a lower semi-circular bearing 45 of identical shape. Mounted between the bearings is a bearing cylinder 46 which is rotatable with respect to the bearings. The bearing cylinder 46 is provided with a slot 47 of a size sufficiently large to accommodate one of the vanes 20 and permit it to slide freely therethrough yet not large enough to permit lateral movement therein. The bearings 44, 45 are likewise provided with openings 48, 49 through which the vanes also pass. The bearing cylinder 46 is preferably made of hard rubber or composition and acts as a solid cushion, a quieting device, and a self cleaning mud, ice and snow remover for the vanes.

If desired, the outer end of each vane may be slotted as at 50, to receive steel bar cross links 51 that extend over the tire 13 and are attached together and tightened by a conventional resilient chain tightener 52. In this manner of operation, the cross links 51 serve as tire chains. Additional traction members 53 may also be attached to the outer end of the vanes.

From the foregoing description of the parts it will be seen that the vanes 20 are each pivotally attached to an inner fixed ring, the brake drum, and to an outer movable ring 25, 26. When it is desired to move the vanes from the inoperative position shown in Fig. 3 to the operative position of Fig. 1, the pinion gear 41 is rotated by means of a wrench engaging the hexagonal head 39 of the shaft 40, to which the pinion gear is rigidly attached. The teeth of the pinion gear engage the teeth of the rack gear 30, so that rotation of the pinion gear causes the rotation of the flanged ring 25, 26. During the rotation of the flanged ring with respect to the stationary brake drum, each vane pivots about the pin 23 at its base, and slides through the slotted bearing cylinder 46 attached to the moving ring. In the inoperative position the slots in the bearing cylinders engage the vanes near the outer ends thereof as shown in Fig. 3. Upon rotation of the movable ring through an angle of approximately 90°, the vanes slide through the slots in the bearing cylinders to a point near the center portion of the vanes, so that the outer end of each vane extends beyond the outer diameter of the tire, as shown in Figs. 1 and 2. In rotating the hexagonal head, the serrations 38 on the inner side thereof slide over the serrations 37 on the sleeve bearing 35. When the operative position has been reached the vanes are locked in position by the engagement of the two sets of serrations 37, 38.

In the operative position, the teeth 21 on the outer edge of the lower vanes will engage the ground and provide increased traction. The vanes are strong enough in their construction to serve as a jack for the car wheels, so that in the event of a puncture, when it is desired to change a tire, the wheel is raised off the ground by use of the vanes while the tire is being changed. Also, it would be possible in the event of a puncture or blow-out, to ride to the nearest service station with the traction wheel in the full open position.

The traction wheel is somewhat like a paddle wheel, and could be used in water as a means of propulsion, particularly if applied to four wheels as in military vehicles. The device is particularly adapted to give traction on sand and swampy terrain.

When desired, the steel bar cross links 51 may be installed so as to increase the surface in contact with the ice and serve as tire chains.

Although the actuation of the vanes from an inoperative to an operative position has been described as a manual operation, it is possible to operate on a mechanical arrangement wherein the vanes can be actuated simultaneously with the application of the car brakes. Means could be provided to lock the vanes in the open position if desired, or to render them inoperative.

It will be obvious to those skilled in the art that various changes may be made without departing from the spirit of the invention and therefore the invention is not liimted to what is shown in the drawings and described in the specification but only as indicated in the appended claims.

I claim:

1. An attachment for motor vehicles comprising a wheel, a tire mounted on said wheel, a brake-drum fixed to said wheel, a plurality of vanes pivoted at their inner ends to said brake-drum at points inwardly of the tire periphery and extending substantially radially outwardly therefrom so that their outer ends extend beyond the periphery of the tire to engage the ground, a movable ring mounted on said brake-drum and radially spaced therefrom, means for rotating said ring with respect to said brake-drum, a plurality of slots circumferentially arranged in said movable ring, each of said vanes extending through one of said slots, whereby upon rotation of the said movable ring with respect to the said brake-drum each of said vanes is caused to pivot about its inner end while sliding through its slot in the movable ring from the operative position where the slot engages the vane at a point near the central portion of the vane to the inoperative position where the slot engages the vane at a point near the outer end thereof.

2. An attachment for motor vehicles substantially as described in claim 1 wherein said brake-drum is provided with a plurality of cooling ribs extending outwardly therefrom, said movable ring is L-shaped in cross-section, the portion of said ring containing said slots being radially spaced from said brake-drum and parallel thereto and the second portion of said ring being rotatably mounted between adjacent cooling ribs on said brake-drum.

3. An attachment for motor vehicles substantially as described in claim 2 wherein the means for rotating said ring includes a section of the second portion of said ring in the shape of a rack gear, a pinion gear adapted to engage the teeth of said rack gear, and means for rotating said pinion gear.

4. An attachment for motor vehicles comprising a wheel, a tire mounted on said wheel, an inner ring immovably fixed to said wheel, a plurality of vanes pivoted at their inner ends to said inner ring at points inwardly of the tire periphery and extending substantially radially outwardly therefrom so that their outer ends extend beyond the periphery of the tire to engage the ground, an outer rotatable ring mounted on said wheel and radially spaced from said inner ring, means including a pinion gear operatively connected to said outer ring for rotating said outer ring with respect to said inner ring, a plurality of slots circumferentially arranged in said outer ring, each of said vanes extending through one of said slots, whereby upon rotation of said outer ring with respect to said inner ring each of said vanes is caused to pivot about its inner end while sliding through its slot in said outer ring to move from the operative position where the slot engages the vane at a point near the central portion of the vane to the inoperative position where the slot engages the vane at a point near the outer end thereof.

PAUL O. DE RAGON.

REFERENCES CITED

The following references are of record in the file of this patent:

UNITED STATES PATENTS

| Number | Name | Date |
| --- | --- | --- |
| 862,553 | Gillespie | Aug. 6, 1907 |
| 1,849,004 | Glapion | Mar. 8, 1932 |
| 1,955,197 | McHenry et al. | Apr. 17, 1934 |
| 2,195,983 | Daley | Apr. 2, 1940 |

FOREIGN PATENTS

| Number | Country | Date |
| --- | --- | --- |
| 286,314 | Germany | Dec. 9, 1913 |
| 337,728 | Italy | Mar. 12, 1936 |